United States Patent [19]

Tench et al.

[11] Patent Number: 5,123,288

[45] Date of Patent: Jun. 23, 1992

[54] AVERAGING PITOT PROBE

[75] Inventors: Robert B. Tench; David A. Churchill, both of Solihull, England

[73] Assignee: British Gas PLC, London, England

[21] Appl. No.: 595,597

[22] Filed: Oct. 10, 1990

[30] Foreign Application Priority Data

Oct. 26, 1989 [GB] United Kingdom ............... 8924103

[51] Int. Cl.$^5$ .............................................. G01F 1/46
[52] U.S. Cl. ................................ 73/861.66; 73/202.5
[58] Field of Search .................. 73/202, 202.5, 861.65, 73/861.66

[56] References Cited

U.S. PATENT DOCUMENTS

| | | | |
|---|---|---|---|
| 1,250,238 | 12/1917 | Spitzglass | 73/861.66 |
| 1,508,017 | 9/1924 | Greve | 73/861.66 |
| 3,425,277 | 2/1969 | Adams | 73/202.5 X |
| 3,559,482 | 2/1971 | Baker et al. | 73/202.5 X |
| 3,751,982 | 8/1973 | Lambert | 73/861.66 |
| 3,803,921 | 4/1974 | Dieterich | 73/861.66 |
| 4,343,195 | 8/1982 | Victor et al. | 73/861.66 |
| 4,546,655 | 10/1985 | Victor | 73/861.66 |
| 4,592,239 | 6/1986 | Cutler | 73/861.66 |
| 4,624,146 | 11/1986 | Nakagawa | 73/861.66 |

FOREIGN PATENT DOCUMENTS

| | | |
|---|---|---|
| 477275 | 12/1937 | United Kingdom . |
| 613182 | 11/1948 | United Kingdom . |
| 2128754 | 5/1984 | United Kingdom . |

OTHER PUBLICATIONS

Fluid Meters, Therir Theory and Application, 5th Edition, published by ASME, FIG. 30, p. 54.

*Primary Examiner*—Herbert Goldstein
*Attorney, Agent, or Firm*—Oblon, Spivak, McClelland, Maier & Neustadt

[57] ABSTRACT

To measure speed of gas flow along a pipe a flowmeter is used comprising a gas flow sensor connected by tubing with an averaging pitot probe formed by first and second tubes of circular cross-section disposed side by side and closed at their one and the same ends and mounted in a gas tight manner in the wall of the pipe. The two tubes are identical in shape and dimensions and each has four circular holes through its tube wall. All the holes are of the same shape and size, and each has a diameter in the range 0.4 mm to 1.00 mm. The internal diameter of each tube is at least 1.59 mm, and the ratio of the cross-sectional area of each tube to the cross-sectional area of each hole is at least 9:1. The positions of the holes in one tube are identical to the positions of the holes in the other tube except that the holes in the first tube face directly upstream with respect to the gas flow whilst the holes in the second tube face directly downstream. With respect to an imaginary plane P between the tubes, the first tube is symmetrical with the second tube. The speed of gas flow to be measured is preferably in the range of 0.3 to 10.00 m/s, and the gas is at or about atomspheric pressure.

18 Claims, 3 Drawing Sheets

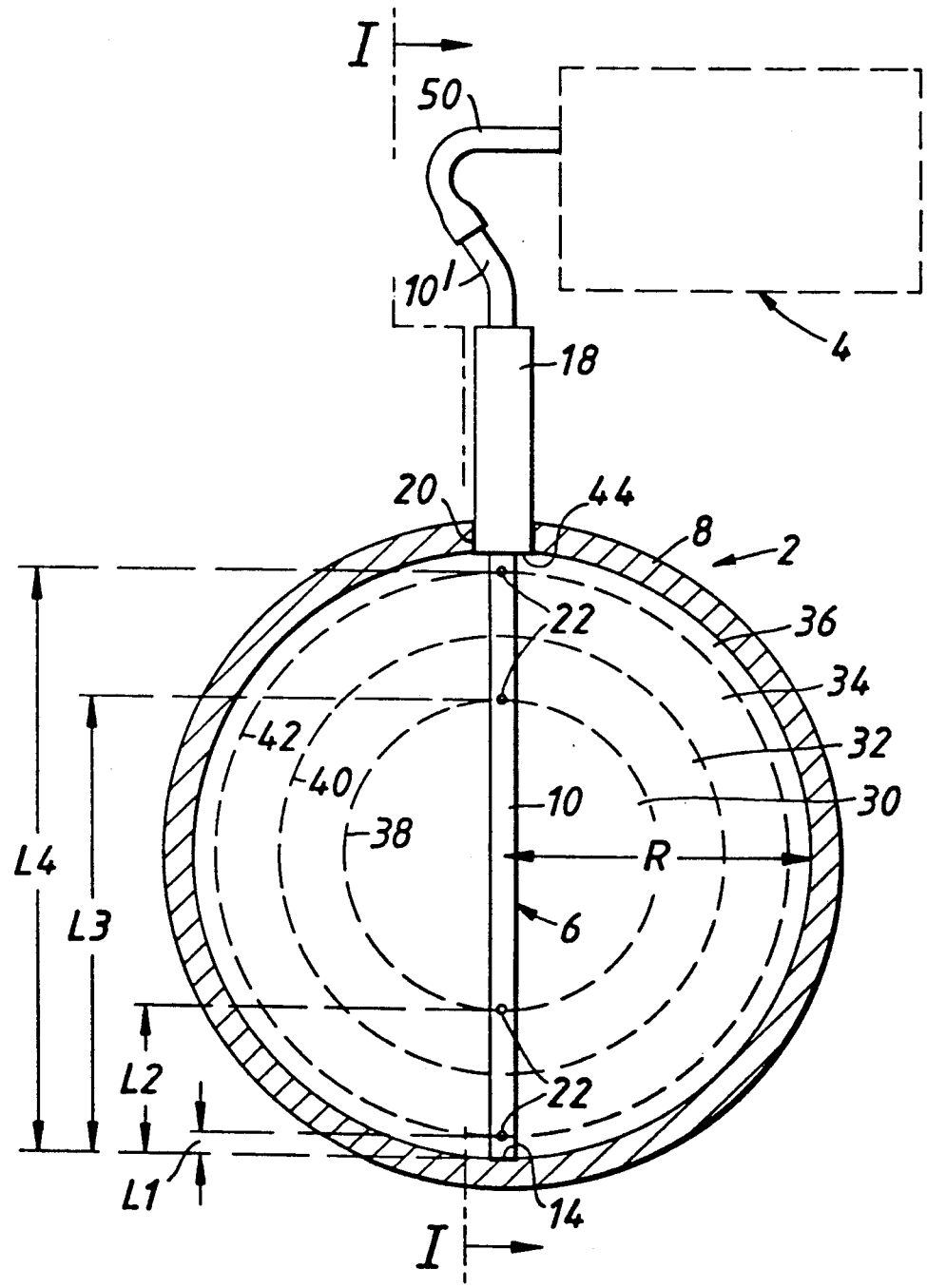

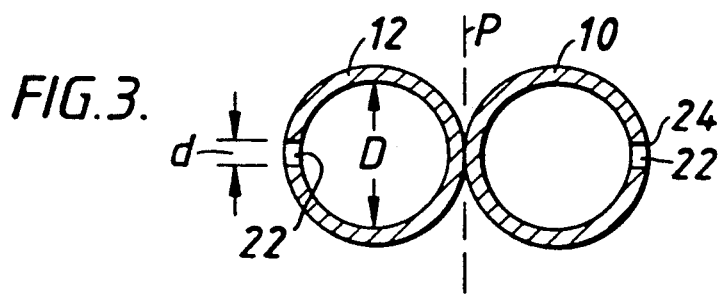
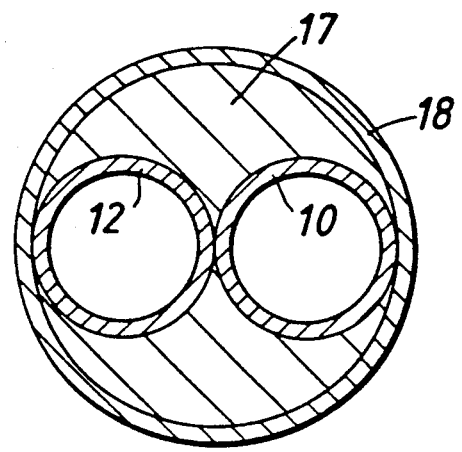
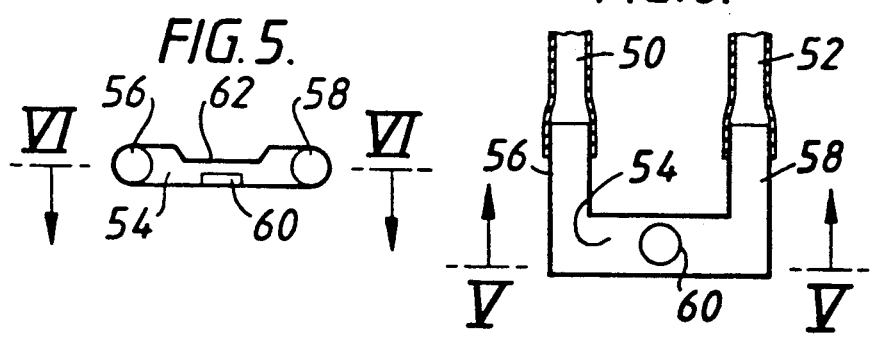
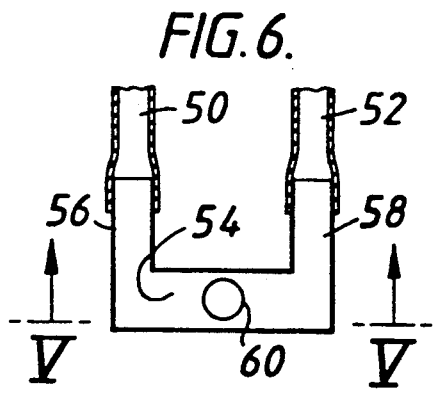
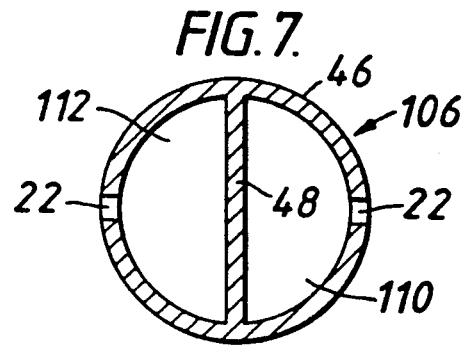

AVERAGING PITOT PROBE

BACKGROUND OF THE INVENTION

This invention relates to an averaging pitot probe.

The averaging pitot probe is intended to form part of an averaging pitot flowmeter to measure the speed of gas flow along a pipe in which the probe is mounted in use.

Known averaging pitot probes comprise first and second tubes disposed one alongside the other, each tube being closed at one and the same end and at the other end communicating with a differential pressure sensor arranged to observe a difference between the pressures prevailing in the tubes, and each tube having at least one hole through the tube wall; said probe being intended for mounting along an internal diameter of a pipe which is to convey gas of which the speed of gas flow is to be measured, the mounting being such that in relation to the direction of gas flow along the pipe the first tube is upstream of the second tube which is thus downstream of the first and said holes are disposed within the interior of the pipe.

To form an averaging pitot flowmeter the said other end of each said tube of the pitot probe is connected by tubing to the differential pressure sensor which provides a signal which is a function of the difference in pressures prevailing in the probe tubes, which signal is in turn a function of the speed of gas flow along the pipe passed the probe and is therefore a measure of the speed of the gas flow along the pipe. The differential pressure sensor comprises an impermeable membrane to either side of which are applied the pressures in the probe tubes. and the resultant deflection of the membrane is observed to provide the aforesaid signal.

An object of the invention is to provide a design of an averaging pitot probe which lends itself and can be constructed to have an improved averaging ability in comparison with known probes, particularly when used to measure the speed in meters per second (m/s) of gas the speed of which is in the range of 0.3 to 10.0 m/s along a pipe in which the gas pressure is at or near to atmospheric pressure.

SUMMARY OF THE INVENTION

According to the invention there is provided an averaging pitot probe to be used in the measurement of the speed of flow of gas along a pipe in which the probe is to be disposed along substantially an internal width (of dimension W) of said pipe, said probe comprising a first tube and a second tube disposed alongside one another and each being closed at one end, the positions of said closed ends coinciding, the other end of each said tube being arranged for there to be in use a gas flow between the interior of the tube and a gas flow sensor when the probe is attached to said sensor, externally said tubes having substantially the same shape and dimensions, internally said tubes having substantially the same shapem and dimensions, each said tube having a wall with least one hole through said wall of the tube, the number of said holes in the first said tube being the same as the number of holes in the second said tube, all said holes being of substantially the same size and shape, each said hole being at a distance from said closed ends which distance is less than said dimension W, said holes being disposed such that the distance any said hole in the first tube is from the closed end thereof is the same as the distance that a said hole in the wall of the second tube is from the closed end of said second tube such that the position of the or each said hole in the first tube is the same as the position of the or a corresponding said hole in the second tube, each said hole having an entrance thereto at the exterior of the tube in which said hole is provided, the entrance to the or each said hole in said first tube facing in a direction opposite to that in which the entrance to the or each said hole in the second said tube faces, and thus with respect to an imaginary plan between the tubes the first tube with its said hole or holes is symmetrical with the second tube with its said hole or holes, each said tube having an internal cross-sectional area which is substanially constant throughout the length of the tube, the cross-sectional area of the or each hole in a said tube being substantially constant along the length of the said hole from the exterior to the interior of the tube, and the ratio of the said internal cross-sectional area of a said tube to the internal cross-sectional area of the or each said hole in the tube being at least 9:1.

BRIEF DESCRIPTION OF THE DRAWINGS

The invention will now be further described, by way of example, with reference to the accompanying drawings in which:

FIG. 2 is a section on line II—II in FIG. 1;

FIG. 3 is section on line III—III in FIG. 1 shown on an enlarged scale;

FIG. 4 is a section on line IV—IV in FIG. 1 shown on an enlarged scale;

FIG. 5 is a diagrammatic representation of gas flow sensing means in the gas flow sensor of the flowmeter in FIGS. 1 and 2, and is a section on line V—V in FIG. 6;

FIG. 6 is a diagrammatic section on line VI—VI in FIG. 5, and

FIG. 7 is a cross-section, comparable with FIG. 3, but of another embodiment of averaging pitot probe formed according to the invention.

DETAILED DESCRIPTION OF PREFERRED EMBODIMENTS

Figure 1:
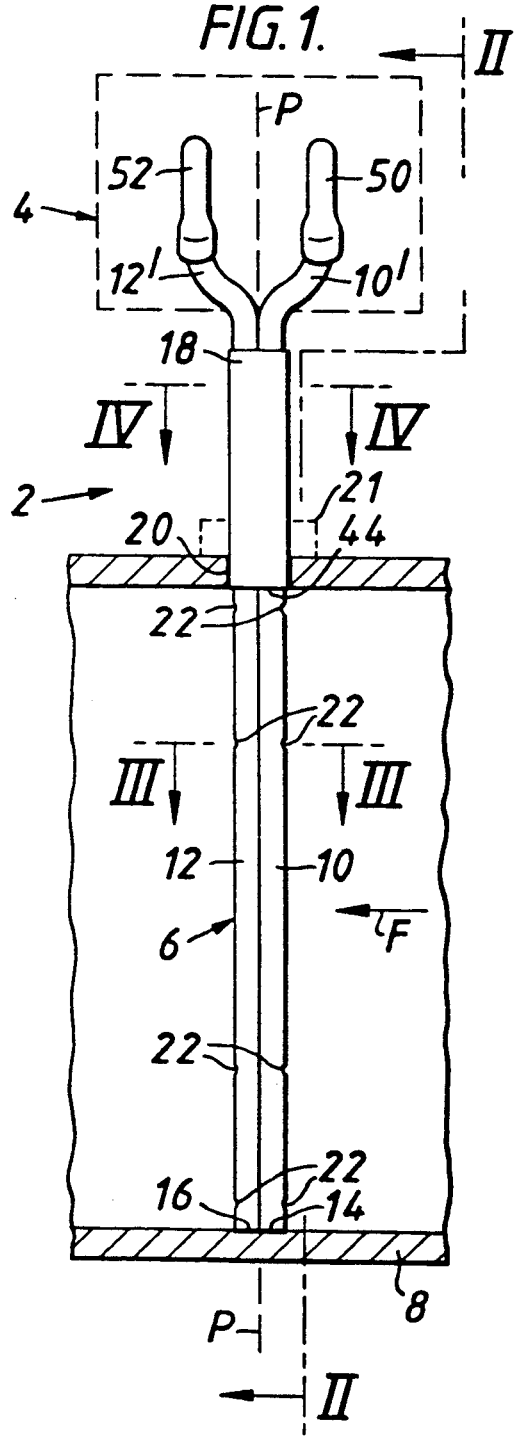
FIG. 1 is a section on line I—I in FIG. 2 showing an embodiment of an averaging pitot probe formed according to the invention mounted in a pipe and forming part of a flowmeter.

With reference to FIGS. 1 and 2, a gas flowmeter 2 comprises a gas flow sensor 4 and an averaging pitot probe 6. The probe 6 is mounted in a pipe 8 conveying gas. Pipe 8 is of circular cross-section. The purpose of the flowmeter is to measure the speed of the gas flow along the pipe 8, that speed being preferably in the range of 0.3 to 10.0 m/s, and the gas pressure being at or near to atmospheric pressure, for example in the range of 95% to 105% of atmospheric pressure.

Probe 6 comprises two tubes 10 and 12 mounted one alongside the other and secured together. The tubes 10 and 12 may be of metal. For the major part of its length each tube 10,12 in FIG. 1 is straight so that for the major part of their lengths the tubes are parallel, but at one and the same end each tube has a bent end part 10' or 12' (as shown in FIG. 2) which diverges from the other end part 12' or 10' as shown in FIG. 1. At its other end, each tube 10,12 is closed at 14 or 16. Each tube 10,12 is of circular cross-section having an internal circular cross-sectional shape and an outer circular cross-sectional shape. Thus as shown in FIG. 3, the combination of tubes 10 and 12 has a figure of eight cross-sectional shape. Each tube 10,12 has the same wall thickness throughout the length of each tube, and the internal cross-sectional area of each tube is the same and is constant throughout the length of each tube. Internally, the length of both tubes 10 and 12 is the same. The external length of both tubes 10 and 12 is also the same.

The combination of tubes 10 and 12 is mounted in a gas tight manner, using a suitable sealant 17, in a sleeve 18 (see FIG. 4). The sleeve 18 may be of metal, and when the tubes 10 and 12 are of metal the sealant may be a solder. The sleeve is fitable in an aperture 20 in the wall of the pipe 8 so that the probe 6 extends along the diameter of the pipe. The pipe 8 can be provided with a suitable fitting 21 (shown in dotted lines in FIG. 1), for example a compression fitting, to secure the sleeve 18 to the pipe in a gas tight manner.

There are four spaced apart holes 22 through the wall of the tube 10 and four holes 22 through the wall of the tube 12. All the holes 22 are circular and of constant cross-sectional shape through the tube wall, thus all the holes are of the same shape and size. For each hole 22 in the tube 10 there is an identically positioned hole 22 in the tube 12.

With respect to an imaginary plane P between the tubes, the tube 10 is symmetrical with the tube 12.

Each hole 22 has an entrance 24 (see FIG. 3) at the outer surface of the corresponding tube 10 or 12, the entrances 24 in the tube 10 facing in a directly opposite direction to that in which entrances 24 in the tube 12 face.

All the holes 22 are positioned so that all lie within the interior of the pipe 8 when the probe is inserted therein as shown in FIGS. 1 and 2 so that the closed ends 14 and 16 are close to or in abutment with the inner surface of the pipe. When the probe 6 is in use it is positioned so that the entrances 24 of one set of holes 22 in one of the tubes 10 or 12 face directly upstream with respect to the flow of gas along the pipe 8, thus the entrances 24 to the other set of holes 22 in the other tube 12 or 10 face directly downstream. Thus if the flow of gas in FIG. 1 is in the direction indicated by arrow F, the holes 22 in the tube 10 are facing upstream and those in the tube 12 face downstream.

The internal cross-sectional area of the pipe 8 can be divided into four imaginary regions 30, 32, 34 and 36 all of equal area in which the central region 30 is disc shaped surrounded by the concentric annular regions 32,34 and 36. Concentric imaginary boundaries 38,40 and 42 separate two adjacent said regions. The centres of two of the holes 22 in each tube 10,12 lie on the boundary 42 between the two outermost regions 34 and 36, whilst the centres of the other two holes 22 in each tube lie on the boundary 38 between the two innermost regions 30 and 32. When the internal radius of the pipe 8 is R (FIG. 2) the length of that part of the probe 6 from the closed ends 14,16 to end 44 of the sleeve 18 is 2R. In each tube 10,12 the centres of holes 22 are located at respective distances L1, L2, L3 and L4 from the tip of the closed ends 14,16, where $$L1 = R\left(1 - \frac{\sqrt{3}}{2}\right);$$

$$L2 = \frac{R}{2};$$

$$L3 = \frac{3R}{2}, \text{ and}$$

-continued $$L4 = R\left(1 + \frac{\sqrt{3}}{2}\right)$$

The ratio of the internal cross-sectional area of each tube 10,12 to the cross-sectional area of each hole 22 is at least 9:1. With reference to FIG. 3 in which D is the internal diameter of each tube 10,12 and d the diameter of each hole 22, the ratio of $$\pi \frac{D^2}{4} \text{ to } \pi \frac{d^2}{4}$$

is at least 9:1. The internal diameter D of each tube 10,12 is preferably not less than 1.59 mm (one sixteenth of an inch). The diameter of each hole 22 lies in the range of 0.4 mm to 1.00 mm.

The holes 22 may be of any shape other than circular, if desired.

Within the pipe 8 there is a length portion of each tube 10,12 extending across the pipe interior from one side to the other, and preferably at least those length portions are straight and parallel.

The two tubes forming a probe may have other cross-sectional shapes besides circular. For example in FIG. 7 a modified probe 106 is formed by two tubes 110 and 112 each having the internal cross-sectional shape of the capital letter D resulting from dividing a main conduit 46, of circular cross-section, by an internal wall 48 extending diametrically across the conduit and also longitudinally of the conduit.

In an alternative construction a modified probe similar to that shown at 106 can be formed by securing together, back to back, two tubes each having a D-shaped cross-section.

In an alternative arrangement the probe 6 (or 106) can have only two holes 22 in each tube 10,12 (or 110,112) those holes being in the same positions in both the tubes so that with respect to the closed ends 14,16 of the tubes a said hole 22 in each tube is at a distance of $$R\left(1 - \frac{1}{\sqrt{2}}\right)$$

from the closed end and the other hole is at a distance of $$R\left(1 + \frac{1}{\sqrt{2}}\right)$$

from that end.

Returning to FIGS. 1 and 2, the probe 6 is shown connected to the gas flow sensor 4 by rubber tubing 50 and 52 fitted on the open ends of the tube portions 10' and 12' and leading to a U-shaped passage 54 in the sensor. Passage 54 is disposed horizontally and has a pair of arm portions 56 and 58 connected to the tubing 50,52. In the floor of the passage 54 and mid-way along its length a gas flow sensor device 60 is located below a lowered roof portion 62 of the passage, the roof portion 62 thereby providing an orifice or constriction at the sensor device. The sensor device 60 can be an electronic device comprising one or more thermistors the temperature whereof is variable as a function of the speed of gas flow thereover along the passage 54 from the tube 10 (in the case of gas flow in direction F) to the other tube 12. In this specification and in the claims appended hereto the term "thermistor" is intended to mean a heat sensitive variable resistance body having an electrical resistance which varies in accordance with variation in the temperature of the body, the term including, for example, a heat sensitive resistor as well as a thermistor of semi-conducting material. The sensor device 60 provides a signal which is a measure of the speed of gas flow along the passage 54 (due to the difference between the pressures in the tubes 10,12) and is thus a measure of the speed of gas flow along the pipe 8. If desired the flow sensor device 60 can be of a type comprising two thermistors so disposed in relation to the direction of gas flow along the passage 54 that one thermistor is upstream of a heater and the other downstream of the heater. A control circuit keeps the heater at substantially a pre-determined constant temperature above the ambient temperature. Gas flow over the upstream thermistor cools that thermistor. The gas then flows over the heater and is warmed thereby. At least some of the heat is then transferred from that gas to the downstream thermistor, and difference in the resistances of the two thermistors is observed to provide a signal which is a function of the speed of the gas flow along the pipe 8.

Preferably the path for the gas between the tube 10 and the device 60 is substantially identical with the path from the devcie 60 to the tube 12.

The sensor 4 can comprise an AWM 2000 Series Microbridge Mass Airflow Sensor of Honeywell Corp., USA.

A range of probes can be produced to be used to measure the speed of gas flow along a particular pipe having an outside diameter in the range of 25.4 mm (one inch) to 152.4 mm (six inches).

We claim:

1. A flowmeter in combination with a pipe conveying gas travelling along the pipe at a speed in the range of 0.3 to 10.0 meters/second and in which pipe said gas is at a pressure at or near to atmospheric pressure, said flowmeter comprising (i) an averaging pitotprobe disposed along substantially an internal width W of said pipe, said probe comprising a first tube and a second tube disposed alongside one another and each being closed at one end, the positions of said closed ends coinciding, the other end of each said tube being arranged for there to be a gas flow between the interior of the tube and a gas flow sensor attached to said probe, externally said tubes having substantially the same shape and dimensions, internally said tubes having substantially the same shape and dimensions, each said tube having a wall with at least one hole through said wall of the tube, the number of said holes in the first said tube being the same as the number of holes in the second said tube, all said holes being of substantially the same size and shape, each said hole being at a distance from said closed ends which distance is less than said dimension W, said holes being disposed such that the distance any said hole in the first tube is from the closed end thereof is the same as the distance that a said hole in the wall of the second tube is from the closed end of said second tube such that the position of the or each said hole in the first tube is the same as the position of the or a corresponding said hole in the second tube, each said hole having an entrance thereto at the exterior of the tube in which said hole is provided, the entrance to the or each said hole in said first tube facing in a direction opposite to that in which the entrance to the or the each said hole in the second tube faces, and thus with respect to an imaginary plane between the tubes the first tube with its hole or holes is symmertical with the second tube with its hole or holes, each said tube having an internal cross-sectional area which is substantially constant throughout the length of the said tube, the cross-sectional area of the or each said hole in a said tube being substantially constant along the length of the said hole from the exterior to the interior of the tube, and the ratio of the said internal cross-sectional area of a said tube to the said internal cross-sectional area of the or each said hole in the tube being at least 9:1, and (ii) said flow sensor comprising wall means defining passage means having first and second opposite ends, the first said end of the said passage means being connected by tubing to said other end of the first said tube and the second said end of the said passage means being connected by tubing to said other end of the second said tube, gas flow sensing means provided in said passage means for observing the speed of flow of gas along the said passage means from one said tube to the other said tube, said gas flow sensing means comprising at least one thermistor exposed to the effect of the flow of gas along said passage means, and said passage means having a constriction at the location of the sensing means.

2. The combination according to claim 1, wherein each said hole is circular cross-section, and the diameter of each hole is in the range of 0.4 to 1.0 mm.

3. The combination according to claim 1, wherein each said tube is of circular cross-section, and the internal diameter of each tube is at least 1.59 mm (one sixteenth of an inch).

4. The combination according to claim 1,wherein in cross-section each said tube has an external circular shape and an internal circular shape such that the combination of the two tubes has a figure of eight cross-sectional shape for a cross-section taken transversely to the axes of the said tubes.

5. The combination according to claim 1, wherein the first and second said tubes are formed by first and second passages along a conduit of circular cross-section divided into the twosaid passages by a wall extending both diametrically across and along the interior of said conduit.

6. The combination according to claim 1, wherein each said tube is substantially straight for a major portion of its length.

7. The combination according to claim 1, wherein there are at least two said holes in each said tube.

8. The combination according to claim 1, wherein there are at least four said holes in each said tube.

9. The combination according to claim 1, wherein there is an even number of said holes in each said tube, the internal cross-sectional area of said pipe can be divided into a plurality of imaginary regions each of equal area, there being as many said regions are there are said holes in a said tube, every said region being surrounded by at least one other said region except for the surrounding region which is outermost, there being an imaginary boundary between each two adjacent said regions, the said holes in each said tube are disposed for each said hole to coincide with a said boundary, and two said holes in each said tube coincide with the same boundary.

10. The combination according to claim 9, wherein said pipe has an inner circular cross-section, a said boundary between two adjacent said regions is circular and is centred on the axis of the pipe, the innermost region is a disc centered on said axis of the pipe and the or each surrounding region is annular also centred on the said axis of the pipe.

11. The combination according to claim 10, in which the pipe has an internal radius of dimension R and there are two said holes in each said tube, and measuring distances from the closed end of each tube the first of said two holes is located at a distance of $$R\left(1 - \frac{1}{\sqrt{2}}\right)$$

and the second of said two holes is located at a distance of $$R\left(1 + \frac{1}{\sqrt{2}}\right).$$

12. The combination according to claim 10, in which the pipe has an internal radius of dimension R and there are four said holes in each said tube, and measuring distances from the closed end of each tube, the first of said four holes is located at a distance $$R\left(1 - \frac{\sqrt{3}}{2}\right).$$

the second of said four holes is located at a distance $$\frac{R}{2},$$

the third of said four holes is located at a distance $$\frac{3R}{2}.$$

and the fourth of said four holes is located at a distance $$R\left(1 + \frac{\sqrt{3}}{2}\right).$$

13. The combination according to claim 1, wherein the said pipe has an interior of circular cross-section having a diameter along which the said probe extends from one side of the said pipe to the opposite side.

14. The combination according to claim 1, wherein the or each said hole in one of said first and second tubes faces substantially upstream with respect to the gas flow along the pipe.

15. The combination according to claim 14, wherein the pipe has an internal cross-section in relation to which the averaging pitot probe within the pipe has a slender shape presenting little obstruction to the gas flow.

16. The combination according to claim 1, wherein the gas pressure in the pipe is in the range of 95% to 105% of atmospheric pressure.

17. The combination according to claim 13, wherein said pipe has external circular cross-section and an external diameter in the range of one to six inches.

18. The combination according to claim 1, wherein said constriction comprises a roof portion of said passage means.

* * * * *